UNITED STATES PATENT OFFICE.

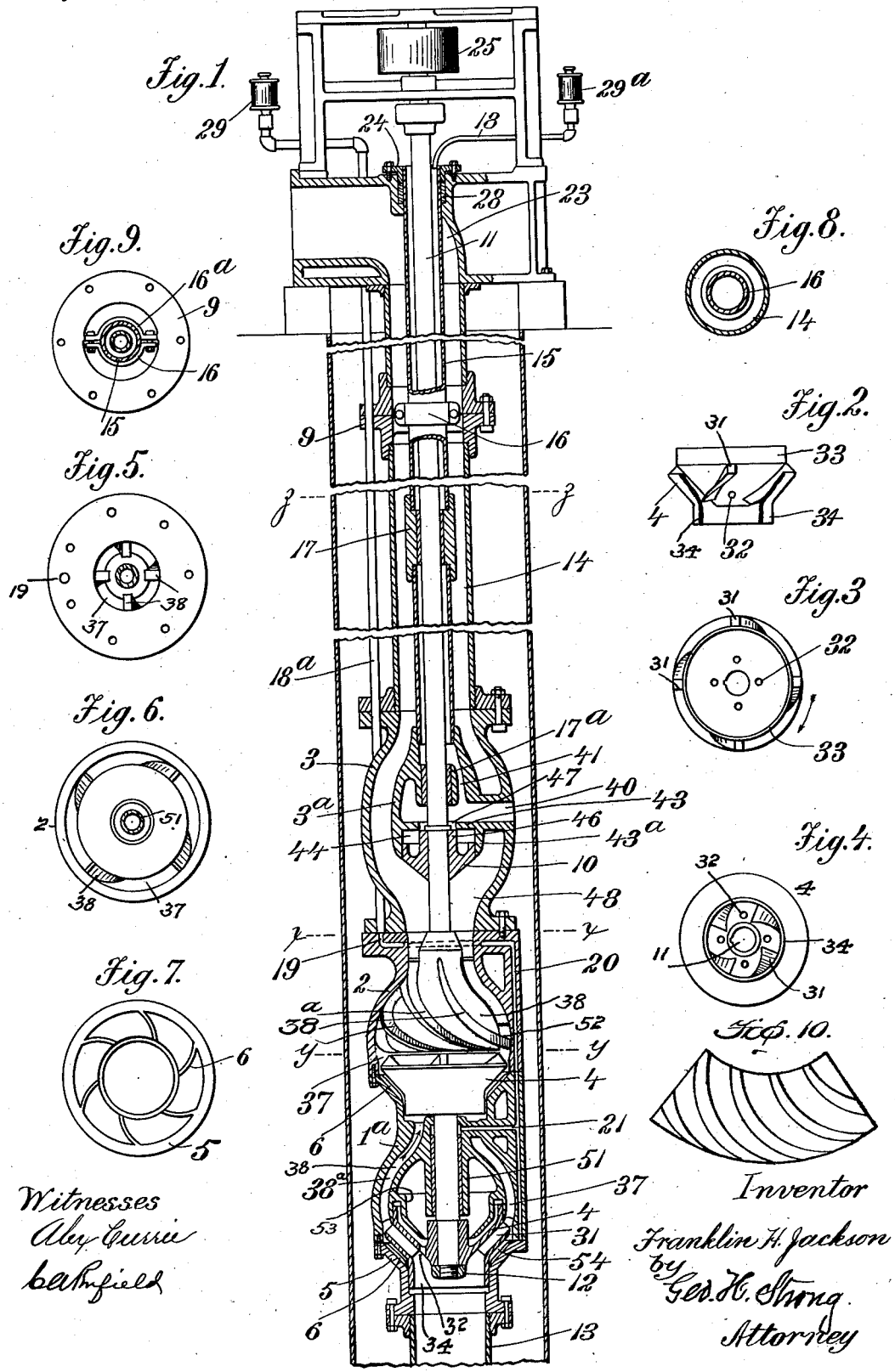

FRANKLIN H. JACKSON, OF WEST BERKELEY, CALIFORNIA, ASSIGNOR TO BYRON JACKSON IRON WORKS, OF WEST BERKELEY, CALIFORNIA, A CORPORATION OF CALIFORNIA.

CENTRIFUGAL PUMP.

986,827.

Specification of Letters Patent. Patented Mar. 14, 1911.

Application filed April 29, 1908. Serial No. 430,021.

*To all whom it may concern:*

Be it known that I, FRANKLIN H. JACKSON, a citizen of the United States, residing at West Berkeley, in the county of Alameda and State of California, have invented new and useful Improvements in Centrifugal Pumps, of which the following is a specification.

My invention relates to improvements in centrifugal pumps, and is especially designed for a high speed pump, employed for bored or other wells where water is below the suction limit from the surface of the ground, or convenient driving point, and to obviate the necessity of digging or boring large and costly wells. It is also so designed that it may be wholly supported from the top of the well, and lowered or removed in sections at will.

It also comprises means for lubricating and protecting the shaft and bearings, and in details of construction which will be more fully explained by reference to the accompanying drawings, in which—

Figure 1 is a vertical section of the apparatus. Fig. 2 is a separate view of a runner, with portion broken away. Fig. 3 is a plan; and Fig. 4 is a bottom view of the runner. Fig. 5 is a top view of the discharge shell on line $x$—$x$ of Fig. 1. Fig. 6 is a bottom view of the shell taken through $y$—$y$ of Fig. 1. Fig. 7 is a top view of the funnel-shaped bottom cover. Fig. 8 is a view taken through $z$—$z$ of Fig. 1. Fig. 9 is a face view of top flange, with semicircular cross bar and tube clamp. Fig. 10 is a diagrammatic view showing a development of the spheroidal passages and stationary guide vanes.

It is one object of my invention to provide a means for elevating water in stages from considerable depths, where the water is below the suction limit from the driving point, and to provide means for automatically lubricating the running parts, and protect the bearings.

11 is a vertical shaft.

25 is a pulley or equivalent device through which power may be transmitted to revolve the shaft at high velocity. This shaft extends down through a shaft tube 15, which may be made in convenient lengths, and coupled by threaded couplings. $17^a$ is a bearing in the upper part of the balancing shell 3, and this shaft has keyed, or otherwise securely fixed to it, a balancing disk 10, and pump runnners 4—4, the lower runner being secured by a nut 12. This shaft is turnable in the shell bearings 51, and these bearings are lubricated by oil through a pipe $18^a$. This pipe extends from an oil cup 29 at the surface, located outside of the discharge pipe 14, through flanges 9 to an oil port 19, and thence to a counterbore in the bearing; thence across to the opposite side to oil port 20, and thence down to the lower bearing 51 through a transverse oil port 21.

The shaft bearing 17 in the tube 15 is lubricated through an oil pipe 18, leading into the open top of the shaft tube 15, oil being supplied by a cup at $29^a$.

The shaft tube 15 is composed of short sections, the threaded ends of which are screwed inside of projecting internally threaded annular flanges on each end of the shaft bearing 17. The upper end of the shaft tube extends through a packing chamber 28 in the discharge elbow 23 and packing gland 24, the top of said tube being open. The lower end of the shaft tube is threaded into internally threaded annular flanges in the upper part of the balancing shell 3, and it has a drain port 41, leading into an enlarged transverse drain port 40 through which it discharges outside of the shell and into the well. It will thus be apparent that the shaft tube 15, and shaft bearings 17, will be thoroughly drained and protected from water in the discharge pipe 14.

The shaft tube 15 is held securely by the semicircular clamps 16, and said clamps are secured by screws as shown, to a cross bar $16^a$, which is cast integral with, and is a part of the flange 9, this cross bar having also a semicircular interior between which and the clamp the tube is held.

The runners 4, which are secured to the shaft, are rotated therewith, at high speed, in the direction indicated by the arrows; that is, clock-wise, when looking from the top of the well.

The water or other fluid to be elevated, will be drawn through a suction pipe 13 by the backwardly curved runner arms 31, and by propeller action, together with centrifugal force, the liquid will be thrown upward and outward, and discharged from the upper side of the runner into the annular space 37 at the bottom of the shell $1^a$, with a high velocity and upward whirling motion, and it is there received by the diffusion or guide vanes 38 in the annular spaces 37 between the outer and inner wall of the containing shell, and the high velocity is gradually slowed down and reduced to pressure and is thence guided through passages 38ª, in the direction indicated by the arrow, and to the center. It is there received by the next runner where the foregoing operation is repeated, and this repetition may occur as many times as the height to which the fluid to be elevated may require. It will be seen that the fluid thus pumped, leaving the upper shell 2, will pass into the space 48 of the automatic hydraulic balancing shell 3, will be at full discharge pressure, and will pass through the annular space in said shell between the outer and inner walls 3—3ª of the balancing chamber; thence up through the annular space between the discharge pipe 14 and the shaft tube 15 to the surface, and thence through the discharge elbow 23 into a reservoir or pipe line. The lower annular flange 34 of the runner is smaller in diameter than the upper annular flange 33. The difference in the area is utilized as follows: The pressure at the rim of the runner fills the space between the conical outer wall of the runner 4, and the bottom cap or cover 5. The conical outer wall at the top of the case 1ª is provided with stationary curved ribs 6 which extend from the outer joint to the central circular opening of the plate 5, and as the runner revolves, the water being also revolved by the skin friction of the runner, will be drawn in, and passing upwardly in the conical space 54, the pressure will be maintained. As the annular top flange of the runner 4 is a rotating fit as shown at 33, there will be a leakage into the space between the top of the runner 4, and the lower conical wall 53 of the case 1ª and 2; and this accumulated pressure would overcome the pressure in the space 54; but the accumulation of pressure on the upper side of the runner in the conical space 52 is prevented by the pressure relief holes 32 near the shaft hub of the runner; these relief holes leading to the suction side of the runner. These runners thus have a given floating or lifting power, owing to the difference in pressure between the top and bottom of the runner; but the lifting or floating power which is sufficient to carry the superimposed water-column, is not sufficient to carry the shafting and rotating parts. I have therefore placed the automatic balancing shell 3 on the top of the upper pump shell 2. The operation of this balance is explained as follows: The water pressure due to the weight of the rising water column in the annular space 48, is transmitted to the under side of the balancing disk or piston 10. This piston is a rotating fit in the annular downwardly projecting flange 43ª which, with the inwardly projecting wall 43, forms a counter pressure chamber 44. There is a little leakage of water past the piston 10 into the chamber 44 above it, and this water in time fills the chamber. In order to prevent this water from acquiring a pressure equal to that on the under side of the piston 10, and thus neutralizing the lifting effect of the water column, a circular port 47 is arranged in the wall 43 so that a slight drop of the shaft, will withdraw the revolving plug 46 which forms the hub of the piston 10 from the circular port 47, and permit water to escape through said port 47 into the discharge ports 40 previously described. But as soon as sufficient water has escaped to permit the resultant increased pressure on the under side of the piston 10, to lift the rotating parts, the revolving plug 46 will close or partially close the port 47, thus trapping a sufficient pressure in the chamber 46 to maintain a practically constant equilibrium, with a slight vertical motion of the shaft, for which motion clearance is allowed in all hubs and collars of the rotating parts.

The operation of my apparatus will then be as follows: The pump may be primed either by submerging it sufficient for the purpose, or by filling it from above, and applying power to revolve the shaft and runners. It will be understood that as many of these units may be superposed as may be desired, and each one by reason of the construction, will act in a measure independent of the one below. The revoluble divergent runners having the propeller arms therein, serve when revolved to move the water by propeller action, but in addition to this, the increase in diameter of the shells in which the runners travel, cause the water which is received from below, to be subjected to centrifugal action due to the increasing diameter of the divergent runners. Thus a combined propeller and centrifugal action is produced which is very effective in raising the water, which being discharged from the upper side of the runner at the largest diameter of the shell, is received by the guide vanes 38, and by them directed through the gradually decreasing passage to the center, where the water is again taken by the next runner and carried through the same process. The high velocity of the water when thus delivered to these guide vanes, is gradually reduced as the water rises, so that it will in each case be ready to be operated upon by the next runner. When the fluid thus pumped passes from the last runner into the balancing shell, it will be at full discharge pressure, and the operation of the revoluble piston in the cylindrical shell and the port around the central hub, allows for a relief when pressure varies, so that the hub of the piston controls the relief opening automatically by the longitudinal movements of the piston, and the parts carried thereby.

Having thus described my invention, what I claim and desire to secure by Letters Patent is—

1. In an apparatus of the character described, a series of superposed shells or casings, said shells being of spheroidal form having inner and outer walls with a spheroidal space therebetween, said space being open at both ends, curved guide vanes in said spheroidal space, the upper one of said openings having a radially outwardly projecting flange, concentric upwardly extending pipes forming a discharge passage between them above the uppermost shell, a revoluble shaft journaled axially within the inner pipe, and extending through the shells, upwardly divergent conical runners fixed to the shaft having their larger portions revoluble in the lower portions of the shells, said runners having annular channels between their outer and inner portions with curved arms within the channels, through which channels the liquid is lifted by a combined propelling and centrifugal force, the liquid being delivered successively from the runner through each shell and thence through a succeeding runner and pressure retaining ribs fixed exteriorly of the runner.

2. In an apparatus of the character described, a series of superposed shells each having spheroidal outer and inner walls, with a spheroidal space between said walls, said space being open at both ends, curved guide vanes in said spheroidal space, the upper one of said openings having a radially outwardly projecting flange, concentric conducting tubes connected with the shells, a central, revoluble, vertical shaft above the innermost tube, bearings within the inner tube in which said shaft is turnable, runners fixed to the shaft, said runners being of upwardly divergent conical form having their upper portions revoluble within the lower portions of the shells, said runners having annular channels between their outer and inner portions with curved arms within the channels adapted to propel the liquid therethrough and pressure retaining ribs of curved form fixed exteriorly of the runners, said shells and concentric tubes forming a discharge passage for the liquid, and a balancing means located above the uppermost of said shells.

3. In an apparatus of the character described, a series of superposed shells each having spheroidal outer and inner walls, with a spheroidal space between said walls, said space being open at both ends, curved guide vanes in said spheroidal space, the upper one of said openings having a radially outwardly projecting flange concentric conducting tubes connected with these shells, a central, revoluble, vertical shaft within the innermost tube, bearing within the inner tube in which said shaft is turnable, runners fixed to the shaft, said runners having annular channels between their outer and inner portions with curved arms within the channels adapted to propel the liquid therethrough, pressure retaining ribs of curved form fixed exteriorly to the runners, said shells and concentric tubes forming a discharge passage for the liquid, a balancing means located above the uppermost of the shells, and a drain port and passage from the innermost tube through the upper or balancing shell.

4. A centrifugal pump shell, having spheroidal outer and inner walls, with a spheroidal space between said walls, open at both ends, and curved guide vanes in said annular space, the upper one of said openings having a radially outwardly projecting flange, said inner wall having a cylindrical shaft bearing, an oil port parallel with said shaft bearing extending from said radial flange to opposite end of the pump shell, and having an oil port at right angles thereto, extending to said shaft bearing.

5. A spheroidal shell having inner and outer walls and a spheroidal annular space between said walls, with annular openings at either end of said space, outwardly projecting flanges extending from said openings, said inner wall terminating at the upper end thereof in a projecting internally threaded annular flange, a shaft bearing, an annular space intervening between said annular flange and the shaft bearing and having a drain port extending to a centrally located annular chamber, supporting arms in the outer annular space, relief ports extending therethrough, a cylindrical flange at the lower end of the inner wall, a revoluble balancing piston fitting said cylinder, and an inwardly projecting annular flange having a centrally located circular opening of smaller diameter than said cylinder.

6. A stationary spheroidal shell, having a spheroidal inner wall, a centrally located annular chamber inside of said inner wall, and having relief ports extending from said chamber through said inner wall, hollow supporting arms in the space between said inner wall and outer wall, and opening through said outer wall.

7. In an apparatus of the character described, a balancing device consisting of a stationary shell having spheroidal outer and inner walls and an intermediate spheroidal space, said space being open at both ends, and said shell having a chamber formed in the lower central portion thereof, an inwardly projecting flange at the upper part of said chamber, a central revoluble shaft extending through said chamber, a plunger fixed to the shaft, the lower part of the plunger substantially fitting the chamber, and a hub or extension adapted to fit the end of the space within the flange, and to open and close said space when the shaft is depressed or raised in its bearings.

8. In a deep well centrifugal pump, a discharge pipe, radially projecting coupling flanges, having internally threaded pipe connecting flanges, cross-bars carried thereby, semi-circular clamps corresponding to and secured to said cross-bars.

In testimony whereof I have hereunto set my hand in presence of two subscribing witnesses.

FRANKLIN H. JACKSON.

Witnesses:
 CHARLES EDELMAN,
 C. HOOK.